United States Patent [19]

Ross

[11] Patent Number: 5,680,620
[45] Date of Patent: Oct. 21, 1997

[54] SYSTEM AND METHOD FOR DETECTING ACCESS TO A PERIPHERAL DEVICE USING A DEBUG REGISTER

[75] Inventor: S. Timothy Ross, Georgetown, Tex.

[73] Assignee: Dell USA, L.P., Round Rock, Tex.

[21] Appl. No.: 497,515

[22] Filed: Jun. 30, 1995

[51] Int. Cl.$^6$ .................................................. G06F 11/00
[52] U.S. Cl. .................. 395/704; 395/183.1; 395/835
[58] Field of Search ............................. 395/700, 183.1, 395/704, 835

[56] References Cited

U.S. PATENT DOCUMENTS 5,537,536  7/1996  Groven ........................... 395/183.04

OTHER PUBLICATIONS

Pentium Processor User's Manual, vol. 3: Architecture and Programming Manual, © Intel Corporation, 1983, Chapter 17, Debugging, pp. 17-1–17-9.

Pentium Processor User's Manual, vol. 3:Architecture and Programming Manual, Intel Corp., Chap. 17, Debugging, pp. 17-1–17-9.

*Primary Examiner*—Alvin E. Oberley
*Assistant Examiner*—Kakali Chaki
*Attorney, Agent, or Firm*—Skjerven, Morrill, MacPherson, Franklin & Friel L.L.P.; Stephen A. Terrile

[57] ABSTRACT

In a microprocessor, a debug facility traps accesses to a peripheral device, such as a speaker, residing at I/O port addresses. In one embodiment, a number of debug registers are provided for a system or an application program to set a trap at specific I/O or memory address, and to associate the specified address to an exception handling program. When another application program accesses the specified address, for example to adjust the settings of a speaker, the exception handling program is triggered to perform a specified task, such as to alert the program that the other application program accessed the device it intended to monitor.

21 Claims, 6 Drawing Sheets

| LEN3 | R/W3 | LEN2 | R/W2 | LEN1 | R/W1 | LEN0 | R/W0 | 00 | GD | 000 | GE | LE | G3 | L3 | G2 | L2 | G1 | G0 | L0 | DR7 |
|---|---|---|---|---|---|---|---|---|---|---|---|---|---|---|---|---|---|---|---|---|
| RESERVED ||||||||| BT | BS | BD | RESERVED |||| B3 | B2 | B1 | B0 | DR6 |
| RESERVED |||||||||||||||||||| DR5 |
| RESERVED |||||||||||||||||||| DR4 |
| BREAKPOINT 3 LINEAR ADDRESS |||||||||||||||||||| DR3 |
| BREAKPOINT 2 LINEAR ADDRESS |||||||||||||||||||| DR2 |
| BREAKPOINT 1 LINEAR ADDRESS |||||||||||||||||||| DR1 |
| BREAKPOINT 0 LINEAR ADDRESS |||||||||||||||||||| DR0 |

SYSTEM AND METHOD FOR DETECTING ACCESS TO A PERIPHERAL DEVICE USING A DEBUG REGISTER

BACKGROUND OF THE INVENTION

1. Field of the Invention

The present invention relates to computer systems, and more particularly to providing interrupt like capabilities to input/output (I/O) devices which are used in computer systems such as personal computer systems.

2. Discussion of the Related Art

Personal computer systems in general and IBM compatible personal computer systems in particular have attained widespread use for providing computer power to may segments of today's modern society. A personal computer system can usually be defined as a desk top, floor standing, or portable microcomputer that includes a system unit (also referred to as a host system) having a system processor and associated volatile and non-volatile memory, one or more diskette drives, and a fixed disk storage device; the computer system also includes a display, a keyboard, and a mouse coupled to the system unit. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system may also include one or a plurality of I/O devices (i.e., peripheral devices) which are coupled to the system processor and which perform specialized functions. Examples of I/O devices include modems, sound and video devices or specialized communication devices. Often, I/O devices may also include other devices coupled to them. For example, a sound card may have a speaker coupled to it.

In a computer system, operating systems are used to provide interface between applications programs which are executed by the computer and the actual computer hardware. An example of an operating system which operates with personal computers includes the disk operating system (DOS). Examples of multitasking operating systems or environments include the OS/2 operating system and the Windows family of operating systems and environments. It is known to provide operating systems in which more than one program can share a peripheral device.

When a computer system is executing an operating system in which more than one program can share a peripheral device, it is desirable to allow a program to detect access to the peripheral device by another program. Thus allowing the first program to be notified of any changes to the device that were performed by the second program. In the prior art, the mechanism for passing information to the first program about the second program's access of the peripheral device is by way of the peripheral device's device driver, or by means of a software trap or exception under the protected mode operation of the computer.

Often, however, this solution is inadequate. For example, in the IBM compatible computer system architecture, the audio speaker is not provided a capability to interrupt the processor and protected mode operation is not always available. Without a capability to generate a hardware interrupt, or the ability to use protected mode operation, detection of another program's access to a common peripheral device is very difficult, if not impossible.

SUMMARY OF THE INVENTION

It has been discovered that using a debug facility to provide information to a system or application program of another program's access to a shared resource allows the computer system to perform a notification capability. Such a system advantageously provides the shared resource, which may not have an interrupt capability, with an interrupt-like capability without modification to or customization to the system's Basic Input/Output System (BIOS), device drivers or existing hardware. Such a system also advantageously provides this function without the allocation of a hardware interrupt vector.

More specifically, the invention relates to an apparatus for detecting access to a device by an application program. The apparatus includes a microprocessor which executes the application program, a memory coupled to the microprocessor and holding the application being executed by the microprocessor and a debug register circuit coupled to the microprocessor. The debug register circuit includes a breakpoint and a status indicator. The microprocessor monitors the status indicator to determine when a peripheral device is accessed. The status indicator indicates that a peripheral device has been accessed when the breakpoint is triggered.

Additionally, the invention relates to a method of detecting access to a device in a computer system. The computer system includes a microprocessor, a memory coupled to the microprocessor and a debug register circuit coupled to the microprocessor. The method includes the steps of: setting a breakpoint in the debug register circuit to an address, the address being called when access to the device is desired; monitoring the breakpoint within the debug circuit to determine whether the address is accessed; generating a device access interrupt when the address is accessed; and executing a debug interrupt service routine in response to the device access interrupt being generated.

The present invention is better understood upon consideration of the detailed description and the accompanying drawings provided below.

BRIEF DESCRIPTION OF THE DRAWINGS

FIG. 2 is a programmer's model of the debug register circuit of the Pentium microprocessor of the FIG. 1 computer system.

DETAILED DESCRIPTION

Figure 1:
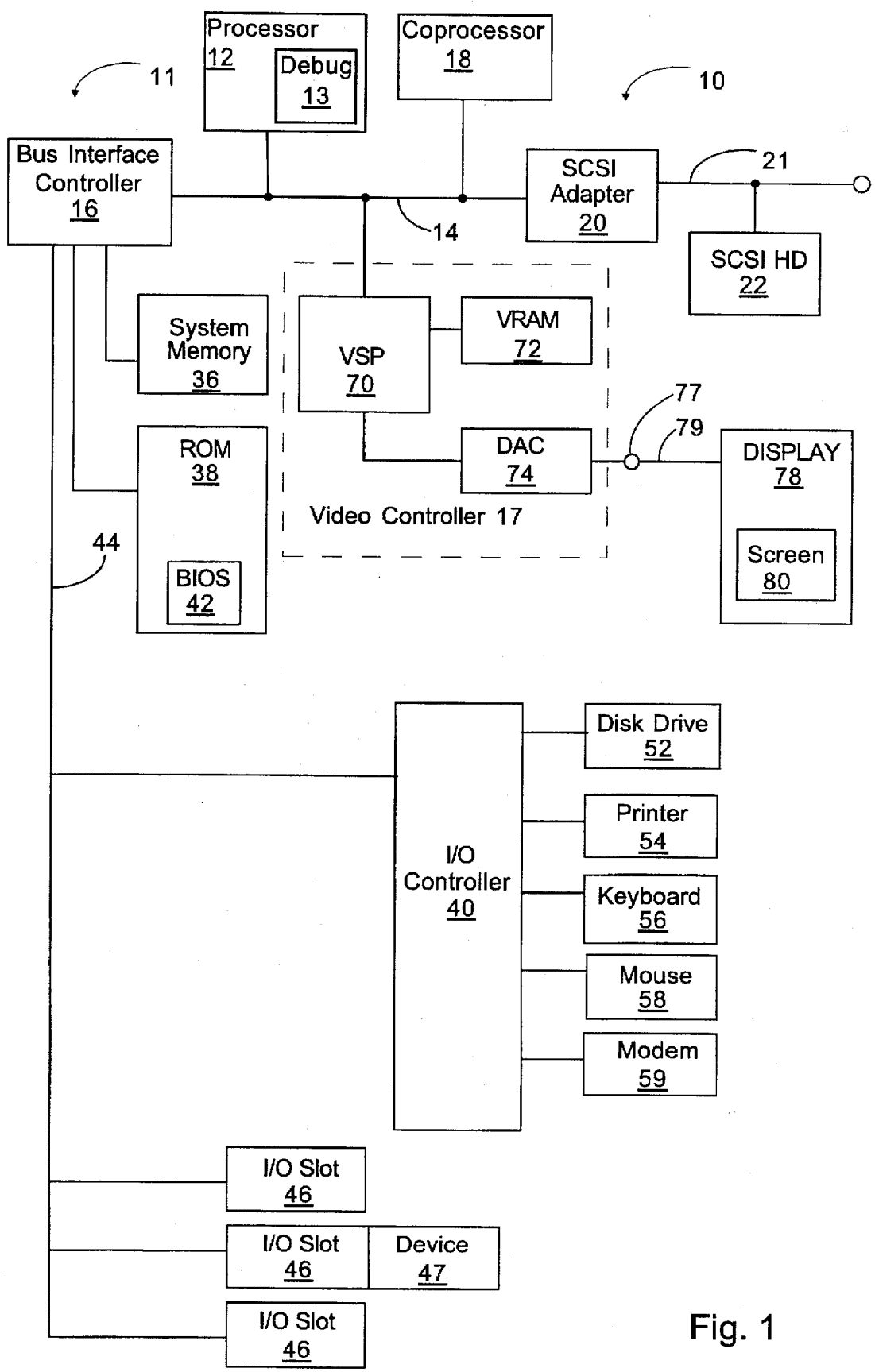
FIG. 1 shows a block diagram of a computer system in accordance with the present invention.

Referring to FIG. 1, personal computer system 10 is shown. Computer system 10 includes processor 12, coupled to local bus 14 which, in turn, is coupled to bus interface controller 16, coprocessor 18, video controller 17 and small computer system interface (SCSI) adapter 20. Processor 12 is preferably a microprocessor from the family of x86 processors, such as a Pentium microprocessor available from Intel Corporation, Santa Clara, Calif. Processor 12 includes debug register circuit 13 which includes a plurality of debug register locations.

Local bus 14 includes conventional data, address and control lines. SCSI adapter 20 couples local bus 14 to SCSI bus 21 to which SCSI devices such as a SCSI hard drive 22 may be coupled. Host unit 11 includes system memory 36, non-volatile memory 38 and I/O controller 40, which are all coupled to bus interface controller 16.

Bus interface controller 16, which is also referred to as core logic, may include one or a plurality of integrated circuits. Bus interface controller 16 performs at least two primary functions. The first function that bus interface controller 16 performs is as a memory controller for accessing main system memory 36 and nonvolatile memory 38. Main system memory 36 is a dynamic random access memory (RAM) which may include one or more single, in-line memory modules (SIMMS) and stores programs and data for execution by system processor 12 and coprocessor 18. Nonvolatile memory 38 is, e.g., a read only memory (ROM) which stores microcode including the basic input output system (BIOS) 42 of computer system 10.

BIOS 42 is a microcode software interface between an operating system or application programs and the hardware of system 10. The operating system and application programs access BIOS 42 rather than directly manipulating I/O ports and control words of the specific hardware. BIOS 42 is accessed through an interface of software interrupts and contains a plurality of entry points corresponding to the different interrupts. In operation, BIOS 42 is loaded from ROM 38 to system memory 36 and is executed from system memory 36.

The second function that bus interface controller 16 20 performs is as an interface between bus 14 and input/output (I/O) bus 44. I/O bus 44 conforms to the industry standard architecture (ISA) standard, which is also sometimes referred to as the AT bus standard. Bus 44 is further coupled to I/O controller 40, and a plurality of I/O slots 46, into which a variety of I/O or expansion cards or devices, e.g., device 47 may be inserted.

I/O controller 40 is also coupled to and controls the operation of disk drive 52, printer 54, keyboard 56 and mouse 58. I/O controller 40 also includes a modem port to which a modem 59 may be optionally connected.

Video controller 17, which is coupled to local bus 14, includes video signal processor (VSP) 70, video RAM (VRAM) 72 and digital to analog converter (DAC) 74. Video signal processor 48 is coupled to video RAM (VRAM) 60 and to digital to analog converter (DAC) 62. Digital to analog converter 66 is coupled display terminal 77. Display 78, which is a computer display device conforming to, e.g., the super video graphics array (SVGA) standard, is coupled to display terminal 77 via display cable 79. Display 78 includes screen 80 on which video information is presented.

Referring to FIG. 2, the present invention is illustrated by reference to the debug registers of the Pentium microprocessor, which is available from Intel Corporation, Santa Clara, Calif.; these debug registers are an example of the arrangement of registers within debug register circuit 13. The defined use of the debug registers of the Pentium microprocessor is described in detail in Chapter 17, "Debugging", Pentium Processor User's Manual, Vol. 3: Architecture and Programming Manual, available from Intel Corporation. According to the present invention, a system or application program specifies a breakpoint in the debug register circuit 13. The breakpoint is a trap or software exception that is triggered when a specified I/O or memory address is accessed.

As shown in FIG. 2, the Pentium microprocessor's debug register circuit 13 provides access to six debug registers DR0–DR3 and DR6–DR7. Debug registers DR4–DR5 are provided in the Pentium microprocessor for software compatibility reasons. Use of debug registers DR4–DR5 is not recommended by the manufacturer of the Pentium processor. Debug registers DR0–DR4 can each hold an I/O or memory address as a breakpoint. The conditions for generating a debug exception in the Pentium microprocessor is specified in the Debug Control Register, which is debug register DR7.

Debug control Register DR7 includes (i) four 2-bit read/write fields (R/W0–RW3), each corresponding to one of the debug registers DR0–DR3; (ii) four 2-bit length fields (LEN0–LEN3), each specifying the range (in bytes) of the specified I/O or memory address within which the breakpoint is effective; (iii) four 1-bit "local" fields, each indicating that the breakpoint condition set in the corresponding debug register DR0–DR3 causes a breakpoint only in the current task; (iv) four 1-bit "global" fields, each indicating that the breakpoint condition set in the corresponding debug register DR0–DR3 is preserved across task boundaries; and (v) a GD bit which protects access to the debug registers. In the Pentium microprocessor, when the "DE" bit of the CR4 register is set, the Pentium microprocessor is operating under the "debug extension" mode, which allows I/O port addresses to be specified in the debug registers DR0–DR3.

When the condition specified for a breakpoint is met, the satisfied condition is reported in Debug Status Register DR6. Debug Status Register DR6 includes four 1-bit fields B0–B3 each of which is set when the conditions for the corresponding one of the debug registers DR0–DR3 is satisfied.

Figure 3:
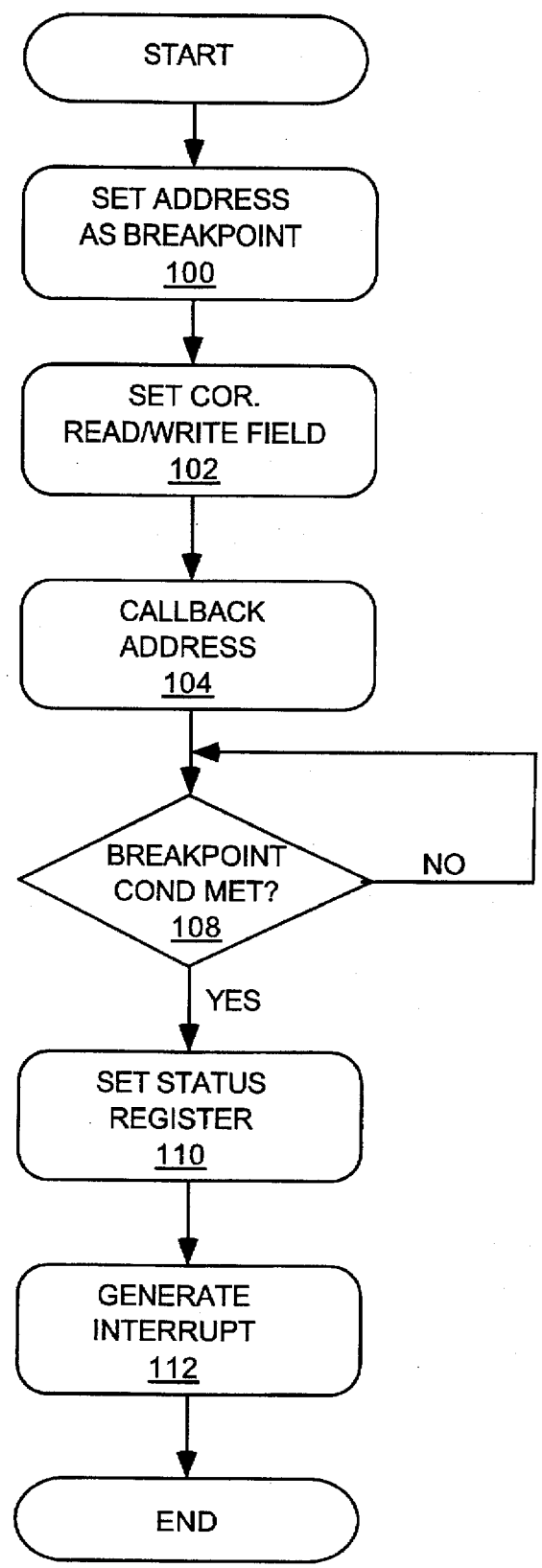
FIG. 3 shows a flow chart of the operation of a system for detecting access to a device in accordance with the present invention.
Figure 5A:
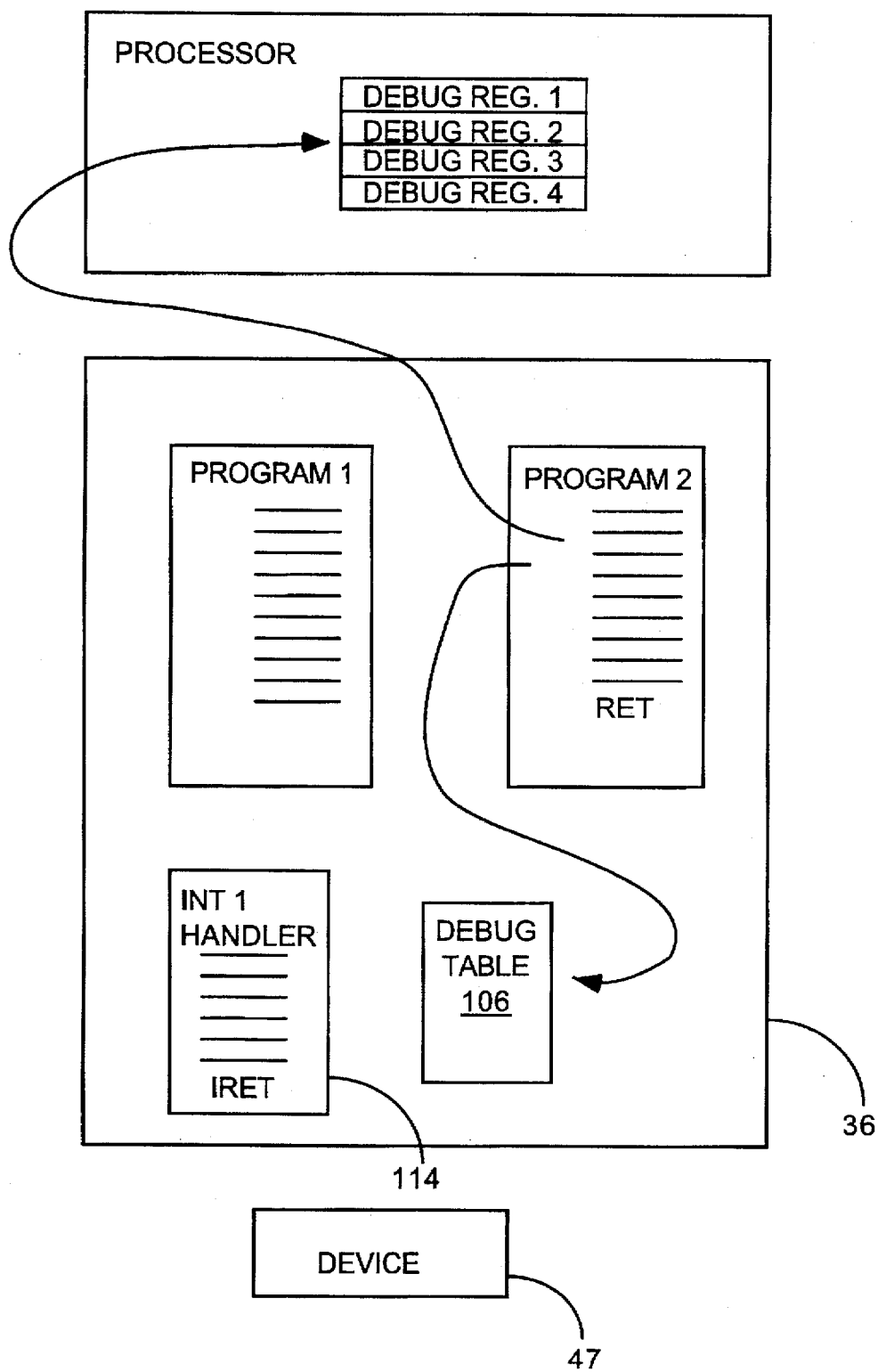
FIGS. 5A and 5B are block diagrams showing the interaction of the various circuit elements of the system for detecting access to a device of FIG. 3.
Figure 5B:
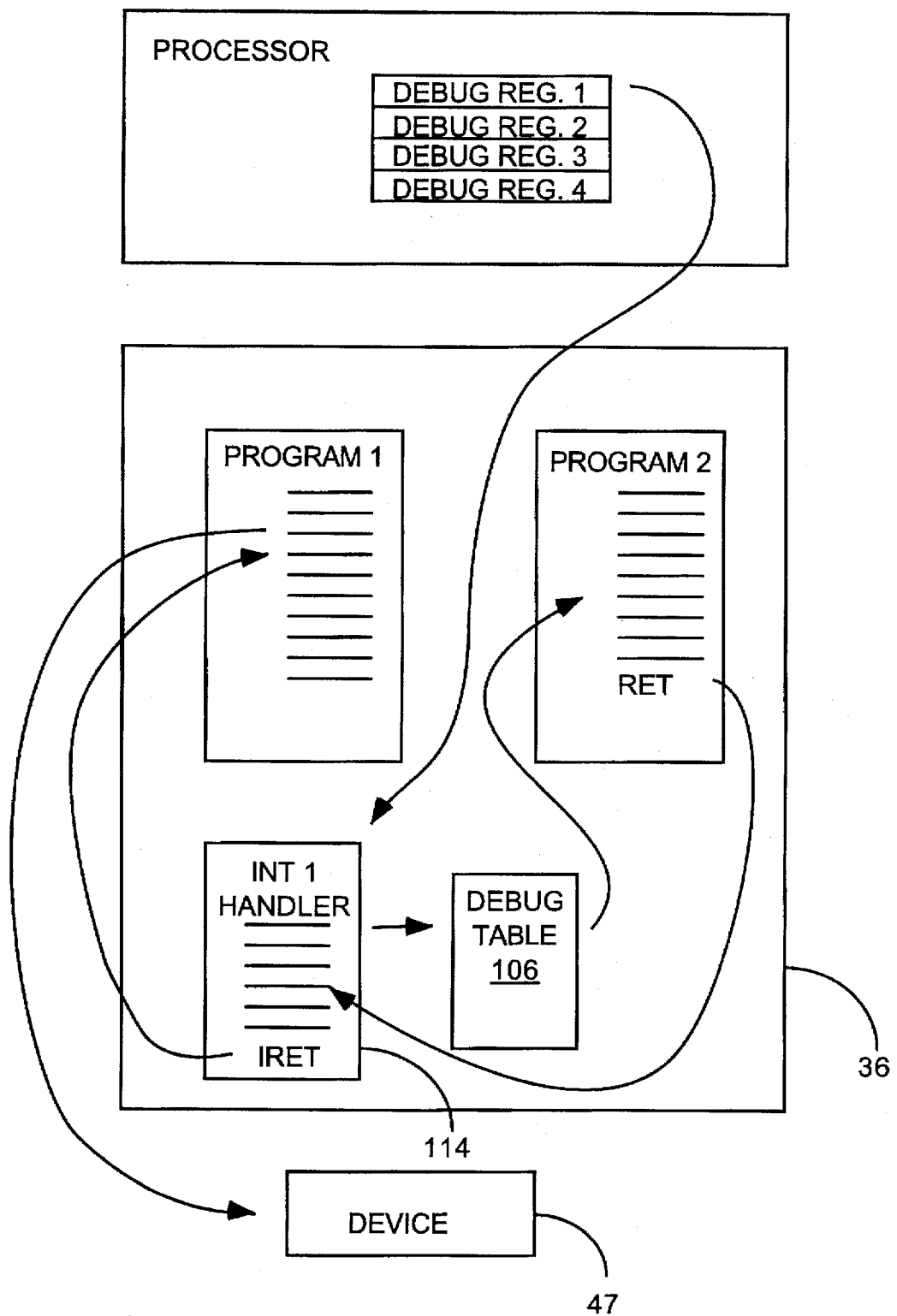

Referring to FIGS. 3, 5A and 5B, according to the present invention, the system for detecting access to a peripheral device is initiated by setting an address as a breakpoint and storing that value within one of the breakpoint locations of debug register circuit 13 at set address as breakpoint step 100. The address which is set as a breakpoint corresponds to the address which is called when access to the device is desired. This address is provided by the program desiring the monitoring, e.g., program 2 in FIG. 5A. Next at read/write step 102, the read/write field which corresponds to the breakpoint register is set to indicate that both reads and writes to the address corresponding to the breakpoint should cause the breakpoint to be tripped, i.e., cause an indication that the breakpoint has been accessed. Next, at callback address step 104, the callback address of the routine to be called is stored within debug table 106 within memory 36. This callback address is the address which indicates where to transfer control when the device corresponding to the stored breakpoint is accessed by another program, e.g., program 1.

After the system is initialized, the system transfers to a monitor mode of operation. During the monitor mode, as indicated by monitor step 108, the breakpoint register is monitored by processor 12 to determine whether the breakpoint has been triggered, as indicated by the address location which is held as the breakpoint value being accessed. While the breakpoint has not been accessed, processor 12 continues to monitor the breakpoint register. When the breakpoint is triggered, as indicated by an address equaling the breakpoint value, then control transitions to status step 110. At status step 110, the status register which corresponds to the tripped breakpoint register is set. When processor 12 detects this register being set, then processor 12 generates a device access interrupt, which is a reserved debug interrupt, INT1, at generate interrupt step 112. This device access interrupt causes processor 12 to access and execute debug interrupt service routine 114, i.e., an interrupt handler routine.

Figure 4:
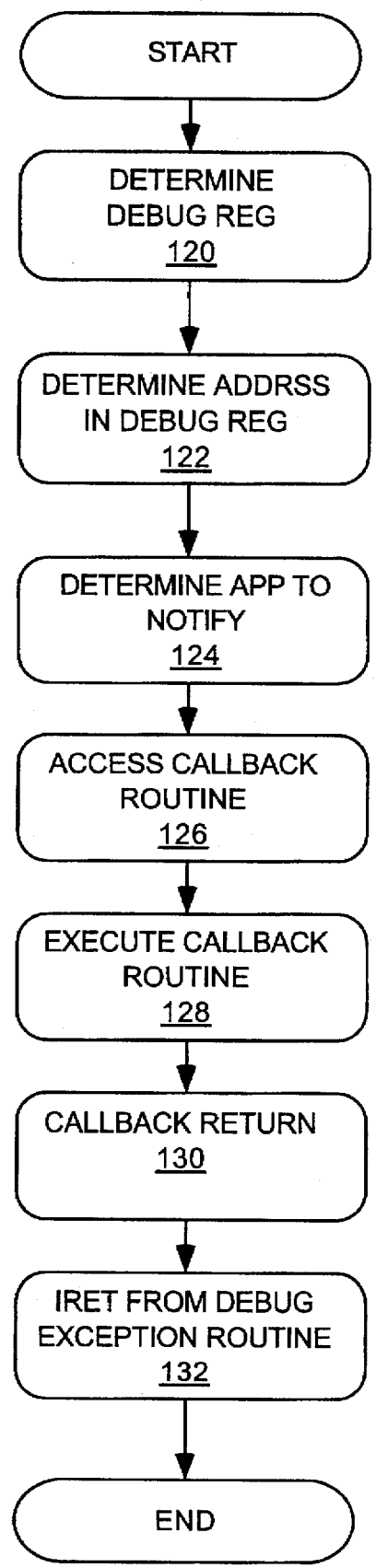
FIG. 4 shows a flow chart of the operation of the system for detecting access to a device upon detection of access to the device.

Referring to FIGS. 4 and 5B, debug interrupt service routine starts by determining which debug register caused the debug interrupt to be generated at debug step 120. After system 10 determines which debug register caused the interrupt to be generated, this register is accessed to determine the address which caused the interrupt at determine address step 122. After the address is determined, thus indicating which device was accessed, then system 10 determines which application to notify by using the callback address entry of debug table 106 which corresponds to the accessed address at determine application step 124. This entry was programmed during store callback address step 104 (see FIG. 3). After the callback address is determined, this address is accessed at access callback routine step 126 and the callback routine which is stored at the callback address is executed at execute step 128. Executing the callback routine performs a function which is desired as a result of detecting an access to the device. After the callback routine is complete, the control transfers to callback return step 130. The interrupt handler routine then continues executing until reaching at IRET step 132, the interrupt return (IRET) instruction, which instructs processor 12 to return from the interrupt handler routine to the program which originally caused generation of the interrupt, e.g., program 1.

For example, in one embodiment, program 1 is an electronic mail program which causes a speaker to sound when mail is received by the program. Program 2 is another program such as a monitor power-down program which is operating in parallel with program 1. When mail is received while program 2 is operating to place computer system 10 in a monitor powered-down mode of operation, then via the use of the present invention, computer system 10 may cause Program 2 to exit the monitor powered-down mode of operation. More specifically, when the speaker is accessed, the callback address which is stored within debug table 106 calls a portion of Program 2 which causes the desired action, e.g., the exit from the monitor powered-down mode of operation. After this is accomplished, then program 2 issues a return to the INT1 interrupt handling program. After the interrupt handling program completes, it transfers control back to Program 1, which continues with its operation.

More specifically, the I/O port address for a peripheral device, such as 61H for the speaker, is set in one of the debug registers DR0–DR3, say DR0, with the corresponding R/W field (i.e. R/W0 for debug register DR0) in the Debug Control Register DR7 set to the bit pattern '10', which indicates that the breakpoint is tripped when port address 61H is read or written. In the case of when a speaker is driven by the accessing application, the driving frequency is specified in a timer ("Timer 2") of the core logic. Another one of the debug registers DR0–DR3 can be provided the I/O port address of Timer 2, so that any change in the driving frequency may also cause a debug exception.

When a debug exception due to an access to the speaker breakpoint occurs, the reserved debugger interrupt INT1 is generated at microprocessor 12. To service this reserved debugger interrupt, processor 12 executes a debug interrupt service routine. The debug interrupt service routine then accesses a callback routine within the monitor power-down program. This callback routine causes the monitor power-down program to transfer from a monitor powered-down mode of operation to a monitor powered-up mode of operation. After this transfer, control then returns to the interrupt service routine. Because the breakpoint for access to the speaker is different from the breakpoint for changing the speaker drive frequency, a change in the speaker driving frequency does not necessarily cause access to the callback routine within the monitor power-down program.

Thus, the present invention assures the monitoring system program or application of notification upon an access by another program to the shared resource. This notification capability is provided without the use of extra or dedicated hardware resource, such as a processor interrupt capability.

OTHER EMBODIMENTS

The above detailed description is provided to illustrate the specific embodiments of the present invention and is not intended to be taken as limiting. Various modifications and variations within the scope of the present invention are possible.

For example, the present invention is applicable not only to the Intel x86 family of microprocessors, but also any microprocessor having a debug facility which allows setting of breakpoints in an instruction execution stream based on access to a specified address. The present invention is defined by the following claims.

Also for example, while the preferred embodiment is described with reference to an I/O bus conforming to the ISA bus standard, it is contemplated that other bus architectures such as the peripheral connect interface (PCI) bus architecture, the Microchannel architecture (MCA), the Extended Industry Standard (EISA) bus architecture, the NuBus bus architecture or the UniBus bus architecture may be used.

I claim:

1. An apparatus for detecting access to a device by first application program, the apparatus comprising:

a microprocessor, the microprocessor executing the first application program and a second application program;

a memory coupled to the microprocessor, the memory holding the first and second application programs being executed by the microprocessor;

a debug register circuit coupled to the microprocessor, the debug register circuit including a breakpoint and a status indicator, the microprocessor monitoring the status indicator to determine when a peripheral device is accessed by the first application program, the status indicator indicating to the second application program that a peripheral device has been accessed by the first application program when the breakpoint is triggered.

2. The apparatus of claim 1 wherein the breakpoint is triggered when a predetermined address location is accessed, the predetermined address location corresponding to a memory address location.

3. The apparatus of claim 1 wherein the breakpoint is triggered when a predetermined address location is accessed, the predetermined address location corresponding to an input/output address location.

4. The apparatus of claim 1 wherein the debug circuit includes a plurality of breakpoints and a corresponding plurality of status indicators, each breakpoint and corresponding status indicator providing the ability to indicate access to a different I/O device.

5. A system for detecting access to a device, the system comprising a microprocessor, the microprocessor operating with a first application and a second application;

a memory coupled to the microprocessor, the memory storing a debug interrupt service routine for providing notice to the first application that the second application has accessed a device address;

a debug register circuit coupled to the microprocessor;

means for setting a breakpoint in the debug register circuit by the first application to an address, the address being called when access to the device is desired;

means for monitoring the breakpoint within the debug circuit to determine whether the address is accessed; and means for generating a device access interrupt when the address is accessed, the microprocessor executing the debug interrupt service routine in response to the device access interrupt being generated.

6. The apparatus of claim 5 wherein the breakpoint is triggered when a predetermined address location is accessed, the predetermined address location corresponding to a memory address location.

7. The apparatus of claim 5 wherein the breakpoint is triggered when a predetermined address location is accessed, the predetermined address location corresponding to an input/output address location.

8. The apparatus of claim 5 wherein the debug circuit includes a plurality of breakpoints and a corresponding plurality of status indicators, each breakpoint and corresponding status indicator providing the ability to indicate access to a different I/O device.

9. A method of detecting access to a device in a computer system, the computer system including a microprocessor, a memory coupled to the microprocessor and a debug register circuit coupled to the microprocessor, the method comprising the steps of:

setting a breakpoint in the debug register circuit to an address, the address being called when access to the device is desired;

monitoring the breakpoint within the debug circuit to determine whether the address is accessed;

generating a device access interrupt when the address is accessed; and executing a debug interrupt service routine in response to the device access interrupt being generated, wherein the debug interrupt service routine provides notice to a first application program that the device was accessed by a second application program.

10. The method of claim 9 further comprising the steps of:

setting a status indication when the address is accessed, the setting a status indication causing the processor to generate the device access interrupt of the generating a device access interrupt step.

11. The method of claim 9 wherein the setting the breakpoint is part of an initializing step, and wherein the initializing step further includes the step of storing a callback address, the callback address indicating where to transfer control when the breakpoint is accessed.

12. The method of claim 11 wherein the register circuit includes a read write field; and the initializing step further includes the step of setting the read write field to indicate that both reads and writes to the address corresponding to the breakpoint cause the breakpoint to be tripped.

13. The method of claim 11 wherein:

the computer system includes a plurality of applications accessing the device the debug interrupt service routine includes the steps of determining which one of the plurality of applications to notify based upon the callback address;

transferring control to a location indicated by the callback address; and wherein the method further includes the steps of executing a callback routine after control is transferred to the callback address location; and transferring control back to the debug interrupt service routine.

14. The method of claim 11 wherein the debug register circuit includes a plurality of breakpoint locations, and the debug interrupt service routine includes the steps of:

determining which of the plurality of breakpoint locations caused the generation of the device access interrupt; and determining the address set as the breakpoint for the breakpoint location which caused the generation of the device access interrupt.

15. The method of claim 14 wherein the debug interrupt service routine further includes the steps of:

determining which application to notify based upon the callback address;

transferring control to the callback address location; and wherein the method further includes the steps of executing the callback routine, and transferring control back to the debug interrupt service routine.

16. A computer system comprising:

a microprocessor, the microprocessor running a plurality of applications;

a memory coupled to the microprocessor;

a debug register circuit coupled to the microprocessor;

means for setting a breakpoint in the debug register circuit to an address, the address being called when access to a device is desired;

means for storing a callback address, the callback address indicating where to transfer control when the breakpoint is accessed;

means for monitoring the breakpoint within the debug circuit to determine whether the address is accessed;

means for generating a device access interrupt when the address is accessed;

means for executing a debug interrupt service routine in response to the device access interrupt being generated, wherein the debug interrupt service routine determines which one of the plurality of applications to notify based upon the callback address and transfers control to a location indicated by the callback address;

means for executing a callback routine after control is transferred to the location indicated by the callback address; and means for transferring control back to the debug interrupt service routine.

17. The computer system of claim 16 further comprising:

a read/write field in the debug register circuit; and means of setting the read/write field to indicate that both reads and writes to the address corresponding to the breakpoint cause the breakpoint to be tripped.

18. The computer system of claim 16 wherein the debug register circuit includes a plurality of breakpoints and a corresponding plurality of status indicators, each breakpoint and corresponding status indicator providing the ability to indicate access to a different address location.

19. A computer system comprising:

a microprocessor, the microprocessor running a plurality of applications;

a memory coupled to the microprocessor;

a debug register circuit coupled to the microprocessor, the debug register circuit including a plurality of breakpoint locations;

means for setting a breakpoint in the debug register circuit to an address, the address being called when access to a device is desired;

means for storing a callback address, the callback address indicating where to transfer control when the breakpoint is accessed;

means for monitoring the breakpoint within the debug circuit to determine whether the address is accessed;

means for generating a device access interrupt when the address is accessed; and means for executing a debug interrupt service routine in response to the device access interrupt being generated, wherein the debug interrupt service routine determines which of the plurality of breakpoint locations caused the generation of the device access interrupt and determines the address set as the breakpoint for the breakpoint location which caused the generation of the device access interrupt, and wherein the debug interrupt service routine further determines which one of the plurality of applications to notify based upon the callback address and transfers control to the callback address location; and means for executing the callback routine, and means for transferring control back to the debug interrupt service routine.

20. The computer system of claim 19 further comprising:

a read/write field in the debug register circuit; and means of setting the read/write field to indicate that both reads and writes to the address corresponding to the breakpoint cause the breakpoint to be tripped.

21. The computer system of claim 19 wherein:

the debug register circuit includes a plurality of breakpoints and a corresponding plurality of status indicators, each breakpoint and corresponding status indicator providing the ability to indicate access to a different address location.

* * * * *